Dec. 15, 1936.  C. H. HUGHES  2,064,005
WATER GAS SET
Filed June 5, 1931 2 Sheets—Sheet 1
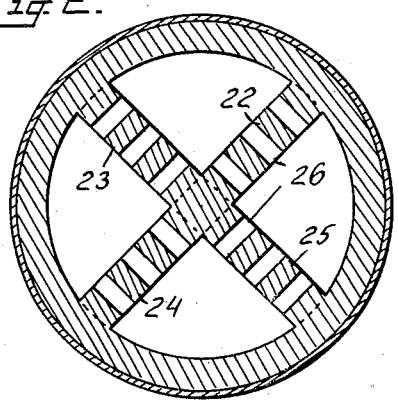
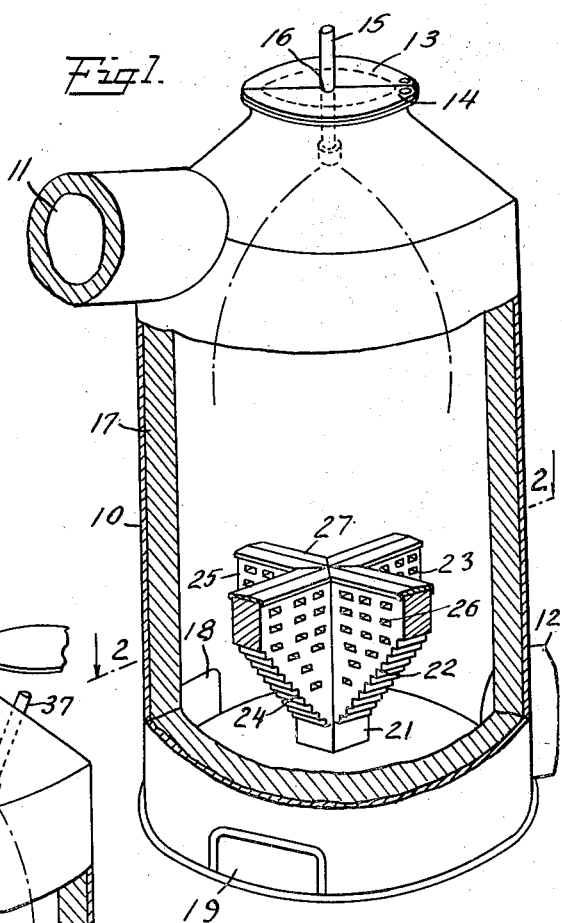
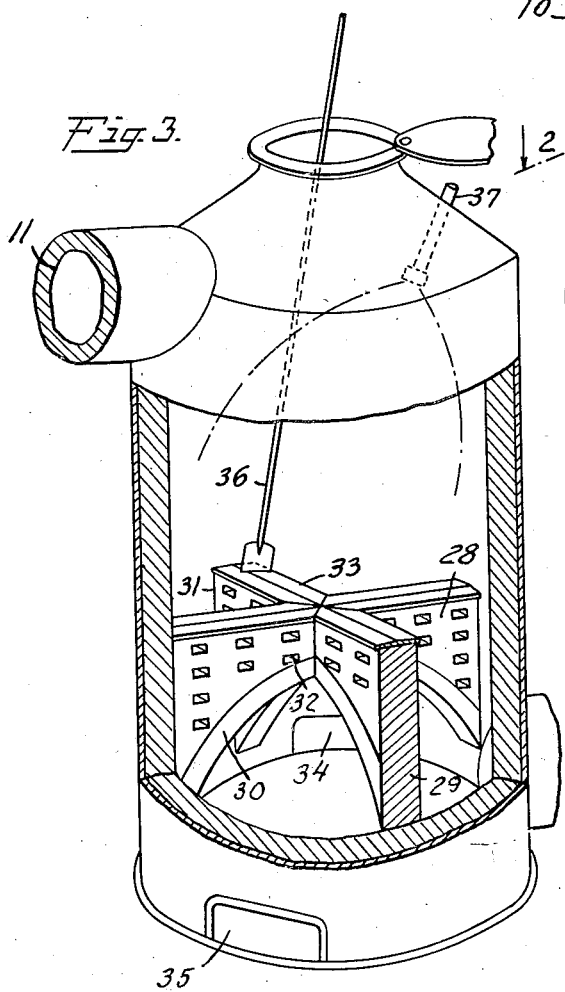
INVENTOR
Charles H. Hughes
BY
ATTORNEY Dec. 15, 1936.                    C. H. HUGHES                    2,064,005
                                  WATER GAS SET
                     Filed June 5, 1931            2 Sheets-Sheet 2
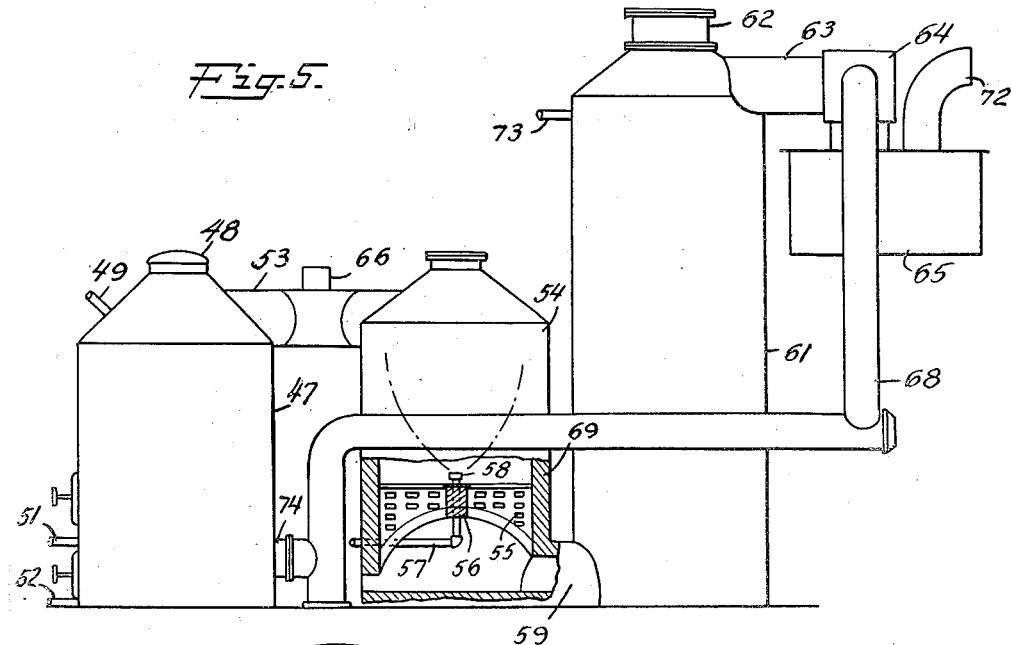
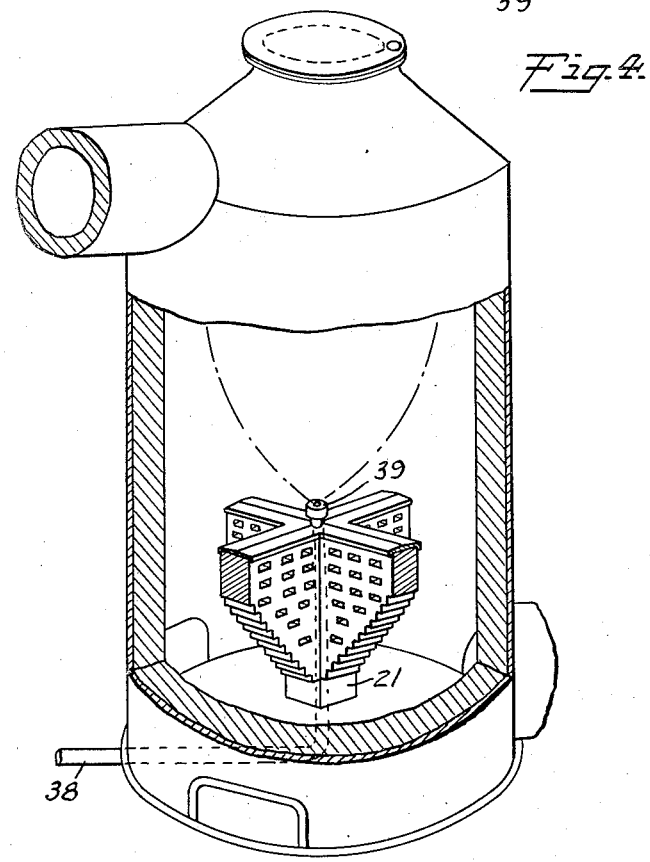
INVENTOR
Charles H. Hughes
BY
ATTORNEY Patented Dec. 15, 1936

2,064,005

UNITED STATES PATENT OFFICE 2,064,005

WATER GAS SET

Charles H. Hughes, Glen Ridge, N. J., assignor to Semet-Solvay Engineering Corporation, New York, N. Y., a corporation of New York Application June 5, 1931, Serial No. 542,270

11 Claims. (Cl. 48—79)

This invention is directed to the manufacture of carburetted water gas, and more particularly, to the construction and operation of a carburetted water gas set involving a generator, carburetor, and superheater connected in series.

One object of this invention is to provide a carburetted water gas set, the carburetor of which is designed to permit enrichment of the water gas passed therethrough with Bunker-C- oil or crude oils, which, upon passage through the heated carburetor, leave a solid carbonaceous residue. Another object is to provide a process of making carburetted water gas in a carburetor of such construction and design that blast gases admixed with secondary air and passed through the carburetor, are ignited and burned, thus efficiently utilizing both the sensible and latent heat of the blast gases in the heating of the carburetor during the blasting cycle. During the subsequent gas-making cycle, the carburetor of this invention functions to accomplish efficient vaporization and admixture of the oil introduced thereinto and the water gas passed therethrough. Further, the carburetor is provided with large unobstructed portions at the base thereof, where the carbonaceous material may settle without interfering with the gas flow through the carburetor and from which portions the carbonaceous residue may be readily withdrawn. Other objects and advantages of this invention will appear from the following detailed description.

Heretofore the usual water gas set consisted of a generator, containing a bed of fuel, and a carburetor and superheater, connected in series with the generator. The interiors of both the carburetor and the superheater were built up with checkerbrick material arranged in staggered relation to form tortuous flues. In the manufacture of water gas, blast gases, produced in the generator by the passage of air or other oxygen-containing gas through the fuel bed therein were discharged from the generator and passed into and through the carburetor and superheater. Secondary air admitted to the carburetor and superheater was admixed with the blast gases, and this mixture was ignited in its passage over the checkerbrick and burned in these chambers, thus heating the checkerbrick. This blasting cycle usually lasted approximately three minutes.

Thereafter, it was discontinued and steam, admitted into the generator, passed therethrough, reacting with the fuel bed therein to produce water gas, which was passed into the carburetor. Oil was introduced into the top of the carburetor, the resultant oil gas, together with the water gas, passing over the checkerbrick therein into and through the superheater. The mixture of oil gas and water gas, in its passage through the carburetor and superheater chambers, was fixed to form carburetted water gas. Thereafter, if desired, steam was passed in reverse flow through the superheater and carburetor units, down through the fuel bed in the generator, the resultant water gas being withdrawn directly from the generator. When the temperatures of the fuel bed and the carburetor and superheater chambers had been reduced so that water gas could no longer be generated, the gas making cycles were discontinued, and the fuel bed again blasted with air or other oxygen-containing gas and upon completion of this blasting cycle, the water gas making cycles were repeated.

It has been proposed to substitute for the usual enriching oil, which does not form substantial carbonaceous deposits on the checkerbrick, Bunker-C or crude oil. In practice, however, it has been found that Bunker-C or crude oils leave a large carbonaceous deposit on the checkerbrick in the carburetor, clogging the flues and necessitating frequent shut-downs for recheckering. The arrangement of checkerbrick in the carburetor precludes the cleaning thereof without removing the checkerbrick from the carburetors and consequently the entire checkerwork had to be replaced, hence entailing arduous and time-consuming labor and decreasing the gas making capacity of the plant since the carburetor had to be taken out of operation for a considerable period of time.

In accordance with Doherty Patent 992,944 of May 23, 1911, checkerbrick has been omitted from the top portion of the carburetor of a water gas set and the carburetting oil introduced into the unobstructed space at the top of the carburetor, into the downwardly flowing water gas stream, passing therethrough. Further, in view of the clogging of the checkerbrick when using Bunker-C or crude oils, it has been proposed to omit the checkerbrick in the carburetor and introduce Bunker-C or crude oils as the enriching medium into the top thereof, the oil gas and water gas flowing in the same direction down through the carburetor into the base of the superheater and up therethrough. Operating in this manner during the blasting cycle, blast gases sweep through the carburetor without substantial ignition thereof and consequently only a portion of the sensible and little or none of the latent heat of the gases is effective in heating the carburetor. Furthermore, operation in this manner creates a serious danger of the non-ignited mixture of air and blast gases exploding in the carburetor.

The carburetor of my invention has a large unobstructed space in which the oil may be vaporized without contact with the checkerwork and has a series of massive walls preferably arranged laterally of the longitudinal axis of the carburetor, which function as heat reservoirs and igniters to cause ignition of the mixture of blast gases and secondary air passed therethrough during the blasting cycle, and also has large unobstructed portions in the base of the carburetor where the carbonaceous material may settle and may readily be removed therefrom. It will be noted that in accordance with this invention the carburetor is designed to utilize both the sensible and latent heat of the blast gases in heating the carburetor during the blasting cycle and enrichment of the water gas with oil is permitted, the carbonaceous residue formed in the carburetor settling to the open portion in the base thereof where it does not interfere with the flow of gas through the carburetor and from whence it may be readily withdrawn through clean-out doors provided at the base of the carburetor.

In the accompanying drawings, forming a part of this specification and showing for purposes of exemplification, preferred forms of the invention but without limiting the claimed invention to such illustrative instances, Fig. 1 is a perspective view, partly in section, of a carburetor of a water gas set, illustrating a preferred embodiment of my invention;

Fig. 2 is a section taken on the line 2—2 of Fig. 1;

Fig. 3 is a perspective view, partly in section, of a modified carburetor construction;

Fig. 4 is a perspective view, partly in section, of a second modified carburetor construction embodying my invention; and Fig. 5 is a side elevation, partly in section, of a water gas set embodying still a further modified form of the carburetor of my invention.

With reference to Fig. 1, 10 designates a cylindrical shell carburetor of the type generally used in connection with a water gas set comprising a generator, a carburetor, and a superheater. An inlet 11 leading from a generator, such as generator 47 of Fig. 5, is provided for conducting gases from the generator into the top of the carburetor. An outlet 12 is provided for conducting the enriched gases from the carburetor to a superheater, such as superheater 61 of Fig. 5. The top of the carburetor shell which is preferably of conical shape is provided with a manhole 13 provided with a readily removable cover 14. A spray pipe and nozzle 15 of any desired type for the introduction of oil is installed at the top of the carburetor as indicated at 16, so that the oil is introduced in coaxial relation to the walls of the carburetor, but it will be understood that the oil spray may be placed at any desired point in the carburetor shell. A lining 17 of refractory material is provided within the carburetor.

Ports 18 and 19, provided in the base of the carburetor serve as clean-out openings for the removal of carbonaceous material deposited as a result of the cracking of the enriching medium introduced at the top of the carburetor. The openings 18 and 19 are provided with any conventional door closure means. Within the carburetor shell and rising from the bottom thereof is a column 21 of refractory material, such as fire brick, or like ceramic material. Preferably, this column occupies but a relatively small area of the bottom of the carburetor shell and rises only a short distance above the bottom. Walls 22, 23, 24 and 25 rise from column 21 in a stepped or corbeled formation, as shown, and extend radially therefrom into bonded contact with the refractory lining 17 of the carburetor. The corbeled walls are of a height equal to approximately one-third of the height of the carburetor and are disposed to define sectors, each of approximately 90°, which sectors constitute large unobstructed spaces into which the carbonaceous residue formed from the oil upon carburetting the water gas may settle. The walls 22, 23, 24 and 25 are preferably constructed of refractory material such as firebrick of the same composition as that of the column 21, which brick are laid to provide a series of apertures 26 in the walls to increase the heat exchange surface and permit of a tortuous flow of the gases through the carburetor.

The tops of walls 22, 23, 24 and 25 are preferably provided with a coping of a suitable high temperature heat-resistant alloy, such for example as the alloy known commercially as "Fahrite" which contains 40% nickel, 20% chromium and 40% iron and will withstand temperature of 2000° F. I have found that the lining of such refractory walls with high temperature heat-resistant metal, particularly a nickel alloy, such as "Fahrite", is particularly advantageous, since the metal has a tendency to prevent the adherence of carbon particles thereto. This characteristic of preventing adherence of carbon is particularly pronounced in nickel or nickel alloys.

The modified form of my invention, shown in Fig. 3 differs from the embodiment shown in Fig. 1 and described above, chiefly in the construction of the interior walls and the position of the oil spray nozzle. In the place of the central column and associated corbeled walls disclosed in the embodiment of Fig. 1, I have provided a series of intersecting arches 28, 29, 30 and 31 arranged at right angles to each other. The arches are preferably bonded with the refractory lining 17 of the carburetor shell and rise to a point of intersection above the bottom of the carburetor and on the longitudinal axis of the carburetor shell, the depth of the arches at the point of intersection being approximately one-third of the depth at the points of contact with the carburetor lining 17. The arches are preferably constructed of firebrick or other refractory material which is laid to provide apertures 32. A heat-resistant coping 33 is provided to discourage the adherence of carbon to the tops of the columns.

It will be noted in all modifications of my invention the coping is slightly beveled so as to prevent accumulation of carbonaceous deposits thereon, and permit of the sliding of carbon particles piling thereon to the bottom of the carburetor. The bottom of the carburetor in the embodiment of Fig. 3, it will be noted, is entirely free of obstructions and is readily accessible for cleaning purposes through ports 34 and 35.

A spray pipe 37 is provided in the conical portion of the carburetor wall 10 opposite the gas inlet 11 and is positioned to direct the oil spray downwardly at an angle toward the intersecting arched walls 28, 29, 30 and 31.

In Fig. 4, I have shown a further modification of the refractory wall structure within the base of the carburetor shown in Fig. 1 wherein the oil is introduced through a pipe 38 entering at the base of the column 21 and terminating in a suitable spray nozzle 39 located at the intersection of the four walls attached to the column. The oil from the nozzle 39 is directed upwardly in a conical spray countercurrent to the downward flow of the water gas. The vaporized oil constituents form a homogeneous mixture with the water gas, the mixture passing down through the carburetor.

In Fig. 5, I have shown still a further modification of the carburetor of my invention as employed in a water gas set wherein 47 designates a water gas generator containing a bed of fuel (not shown). A charging opening 48 for fuel is provided in the top of the generator. Steam may be supplied to the generator through pipes 49 and 51 and air for blasting the fuel within the generator may be supplied through air blast pipe 52. The generator 47 communicates through the pipe 53 with the top of carburetor 54 which contains intersecting arched walls 55 and 56 and refractory lining 69 of types similar to those shown in Fig. 3.

Means is provided for introducing an enriching medium, such as oil, into the carburetor, such means preferably consisting of the pipe 57 extending up through the point of intersection of the arches 55 and 56 and terminating in a spray nozzle 58 adapted to discharge the oil upwardly into the downwardly flowing water gas. A conduit 59 connects the bottom of the carburetor 54 with a superheater 61. The superheater is provided with a stack 62 for discharging waste gases during the blasting cycle and an offtake 63 which leads from the top of the superheater through a housing 64 to a wash box 65. Secondary air opening 66 is provided for the admission of air into the carburetor and superheater during the blasting cycle. A conduit 68 leads from the base of the generator 47 to the housing 64. A suitable valve is positioned in housing 64 to control flow through the set as is well known.

The operation of the above described set usually comprises three cycles, i. e., a "blasting cycle", "an up-run" and a "back-run". In the blasting cycle, air is passed into the generator through line 52 and passes through the fuel therein, raising the temperature thereof until the fuel becomes an incandescent mass. The resultant blast gases are passed into the carburetor 54 through the conduit 53. Secondary air is admitted to the carburetor at 66 and ignition of the air and gas mixture is effected by the high temperatures prevailing in the carburetor due to the refractory lining 69 and the arched walls 55 and 56. As a result the arched walls and the refractory lining 69 become very highly heated. The gases pass from the carburetor through conduit 59 into superheater 61. The waste gases, after heating the interior of the superheater, are discharged through the stack 62. When the arched walls 55 and 56, the refractory lining 69 and the interior of the superheater have been brought to the requisite temperatures, the flow of air to the generator is shut off and the "up-run" cycle begun. Steam is passed into the base of the generator through inlet 51 and passes up through the fuel bed reacting therewith to form water gas. The water gas formed as a result of the reacton between the steam and hot fuel, passes through conduit 53 into the carburetor 54 wherein it is carburetted by the addition of oil through spray nozzle 58. By reason of the transfer of heat from the refractory lining and the arched walls to the Bunker-C or crude oils introduced into the carburetor through the spray nozzle, the oil is immediately volatilized and cracked with the production of carbonaceous material and oil gas. The oil gas becomes intimately mixed with the water gas in their passage through the carburetor. The carbonaceous material settles into the large unobstructed spaces at the base of the carburetor where it accumulates without interfering with the flow of gas through the carburetor. The high temperature present in the carburetor as a result of the heat contained in the arched walls and in the lining partially fixes the mixture of the oil gas and water gas and assists in the production of a fixed homogeneous product.

The resultant mixture passes from the carburetor through the conduit 59 to the superheater 61 wherein fixation is completed. From the superheater, the carburetted water gas formed passes into the wash box 65, from which it is led through outlet 72 to a suitable holder. The "steam up-run" period may be immediately followed by a "steam back-run" period. Conduit 63 is closed to the flow of gas and steam is admitted at 73 or 49, the inlets 51 and 52 being closed. The steam admitted at 73 is superheated in its passage through the superheater and the carburetor and passes into the top of the generator downwardly through the fuel bed therein. The water gas formed passes out of the generator at 74 through the conduit 68 to the wash box 65, thereafter being conducted to a suitable holder.

To remove any carbon deposited on the wall or lining and clean the carburetor walls and refractory walls, it is only necessary to shut off the flow of gas, open the manhole provided at the top of the carburetor and scrape the carbon deposit from the lining and the refractory walls by means of a suitable tool such as that shown at 36. The carbon falls to the bottom of the chamber and is readily removed through the ports at the bottom of the shell. The time consumed in the cleaning operation is of the order of thirty minutes. Thus it is evident that the water gas set need be shut down for only a very short period of time, after which operation may again be resumed.

From the above detailed description, it is apparent that my invention is possessed of many advantages.

It will be noted that in accordance with the invention, Bunker-C-refined or unrefined oils of low cost may be efficiently utilized in the enrichment of water gas, the large unobstructed spaces at the base of the carburetor permitting the settling of the carbonaceous material formed from the cracking of the crude oil from which spaces the residue may be readily removed whenever desired. Furthermore, the refractory walls in the carburetor function to ignite the entering mixture of blast gases and secondary air, thereby serving to release the latent and sensible heat for use in heating the refractory walls and the lining of the carburetor. The provision of the coping of the heat-resistant alloy on the upper faces of the refractory walls discourages the adherence of carbonaceous particles thereto, the carbonaceous material falling therefrom and collecting in the unobstructed spaces provided at the base of the carburetor. The relatively large size of the unobstructed spaces provided for the deposition of carbonaceous material eliminates the necessity of cleaning the carburetor except at relatively long intervals of time.

By virtue of the walls of the carburetor and the intersecting refractory walls combining to vaporize the enriching medium, thus obtaining a concentrated transfer of heat to the oil particles, the oil efficiency is increased especially with the use of crudes or unrefined oils.

The invention as hereinabove disclosed is embodied in a particular form of construction, but it may be variously embodied within the scope of the following claims:

I claim:

1. In a carburetted water gas set, a carburetor comprising a chamber closed at the base and lined with refractory material, said chamber containing an unobstructed vaporizing portion, said chamber containing arches of refractory material extending from and bonded with said lining, said arches rising to a point of intersection at a point substantially on the axis of the carburetor to provide an unobstructed space at the bottom of the carburetor, said arches functioning to retain heat and ignite the mixture of air and blast gases passing through the carburetor during the blasting cycle, and means separate from said arches for introducing oil into the vaporizing portion of the carburetor.

2. In a water gas set comprising a generator, a carburetor and a superheater in series, means for introducing blast gases from the generator to the carburetor during the blasting cycle comprising a gas inlet located in the carburetor, means for admixing the blast gases with secondary air, means to retain heat and ignite the mixture of blast gases and secondary air passing through the carburetor, said means consisting of a refractory wall in said carburetor disposed from one side to the other and arranged to provide an unobstructed space at the bottom of the carburetor, a vaporizing chamber located in said carburetor below the gas inlet, and means for introducing oil into said vaporizing chamber during the passage of water gas through the carburetor from the generator.

3. In a water gas set comprising a generator, a carburetor and a superheater in series, a lining in said carburetor, means to conduct blast gases from the generator to the carburetor, means to admix the blast gases with secondary air, refractory walls in said carburetor arranged radially of the longitudinal axis of the carburetor and bonded with said lining, said walls being arranged to provide an unobstructed space at the bottom of the carburetor and functioning to retain heat and ignite the mixture of secondary air and blast gases passing through the carburetor during the blasting cycle from the generator, a vaporizing chamber in said carburetor, and means for introducing oil into said vaporizing chamber during the passage of water gas through the carburetor from the generator.

4. In a carburetted water gas set, a generator, a carburetor located in a separate and detached shell from the generator and comprising a chamber lined with refractory material, said chamber containing an unobstructed vaporizing portion, the remaining portion of said chamber containing arches of refractory material extending from and bonded with said lining adjacent the bottom thereof and being otherwise substantially unobstructed, said arches intersecting substantially on the axis of the carburetor to provide an unobstructed space at the bottom of the carburetor and functioning to retain heat and ignite the mixture of air and blast gases passing through the carburetor during the blasting cycle, and means for introducing oil into the vaporizing portion of the carburetor.

5. In a carburetted water gas set, a generator, a carbureter located in a separate and detached shell from the generator and comprising a chamber lined with refractory material, said chamber containing an unobstructed vaporizing portion, a column of refractory material rising from the bottom of said carburetor, a series of corbeled walls extending from said column into bonded relation with the lining of said carburetor, said column and walls functioning to retain heat and ignite the mixture of air and blast gases passing through the carburetor during the blasting cycle, and means for introducing oil into the vaporizing portion of the carburetor, the carbonaceous residue formed by the decomposition of the oil settling in an unobstructed space at the base of the carburetor.

6. In a carburetted water gas set, a carburetor comprising a chamber lined with refractory material, said chamber containing an unobstructed vaporizing portion, the remaining portion of said chamber containing intersecting walls of refractory material disposed to provide large, unobstructed spaces therebetween, said walls functioning to retain heat and ignite the mixture of air and blast gases passing through the carburetor during the blasting cycle, and means separate from the walls for introducing oil into the vaporizing portion of the carburetor.

7. In a water gas set comprising a carburetor, means for introducing blast gases to the carburetor during the blasting period, comprising a gas inlet located in the carburetor, means to retain heat and ignite the blast gases passing through the carburetor, said means consisting of a refractory wall in said carburetor disposed from one side to the other and arranged to provide an unobstructed space at the bottom of the carburetor, a vaporizing chamber located in said carburetor above the refractory wall, and means for introducing oil into said vaporizing chamber.

8. For gas making machines, a carburetor having an inlet near its top for communication with a generator, an outlet near its bottom for communication with a superheater, a plurality of substantially vertical partitions within and extending across its interior and arranged to provide an unobstructed space at the bottom of the carburetor, each partition being built up of refractory brick work, an unobstructed vaporizing chamber located in said carburetor above said partitions, and means for introducing oil into said vaporizing chamber.

9. In a water gas set, in combination, a generator and a communicably connected carburetor located in separate and detached shells, means for introducing blast gases from the generator into the carburetor during the blasting period, comprising a gas inlet located in the carburetor, means extending across the carburetor to retain heat and ignite the blast gases introduced into the carburetor, said last mentioned means occupying a minor portion of the volume of the carburetor, leaving the remaining major portion of the volume of the carburetor throughout the horizontal cross-sectional area thereof completely unobstructed, and means for introducing liquid hydrocarbon enriching material into the said unobstructed portion of the carburetor, said means for introducing hydrocarbon enriching material being constructed and arranged to introduce said material in a direction toward said ignition means but being spaced from said ignition means so that said material does not contact therewith while in the liquid phase but is vaporized before such contact can take place.

10. In a water gas set, in combination, a generator adapted to contain a bed of fuel and a communicably connected carburetor, the top of the generator communicating with the top of the carburetor so that flow through the carburetor takes place in a downward direction, means for introducing blast gases from the generator to the carburetor during the blasting period, means to retain heat and ignite the blast gases introduced into the carburetor, said last mentioned means occupying a minor portion of the volume of the carburetor, leaving the remaining major portion of the carburetor throughout the horizontal cross-sectional area thereof completely unobstructed, and means for introducing hydrocarbon enriching material in an upward direction into the said unobstructed portion of the carburetor into the down flowing water gas stream passing therethrough during the water gas making steps, said means for introducing hydrocarbon enriching material being constructed and arranged to introduce the enriching material so that it does not contact with said ignition means.

11. In a water gas set, in combination, a generator and a communicably connected carburetor, means for introducing blast gases from the generator into and through the carburetor during the blasting period, means to retain heat and ignite the blast gases introduced into the carburetor, said means occupying a minor portion of the volume of the carburetor leaving the remaining major portion of the volume of the carburetor throughout the horizontal cross-sectional area thereof completely unobstructed, means for passing water gas during the water gas making steps from the generator through said carburetor, and means for introducing hydrocarbon enriching material into said unobstructed portion of the carburetor in a direction of flow countercurrent to the direction of flow of the water gas through the carburetor, said hydrocarbon enriching material introducing means being constructed and arranged to introduce the hydrocarbon enriching material so that it is projected toward said ignition means.

CHARLES H. HUGHES.